Nov. 19, 1968  R. CHUTE  3,411,808

VEHICLE SAFETY ASSEMBLY

Filed March 9, 1967

INVENTOR.
Richard Chute
BY
Barnard, McGlynn & Reising
ATTORNEYS

United States Patent Office 3,411,808
Patented Nov. 19, 1968

3,411,808
VEHICLE SAFETY ASSEMBLY
Richard Chute, Huntington Woods, Mich., assignor to Eaton Yale & Towne, Inc., Cleveland, Ohio, a corporation of Ohio
Filed Mar. 9, 1967, Ser. No. 621,974
11 Claims. (Cl. 280—150)

ABSTRACT OF THE DISCLOSURE

A safety assembly adapted to be attached to a vehicle for protecting an occupant thereof and including an inflatable bag, a container to store fluid for inflating the bag, an explosive means disposed within the container for opening the container upon activation thereof, a helically coiled spring-like member disposed about the container for controlling the opening of the container when the explosive means is activated, and an outer cylindrical member disposed thereabout and having elongated narrow slots therein for controlling the flow of fluid into the bag to prevent the inadvertent rupture of the bag.

---

Recently, a great deal of research and development has occurred in an effort to develop safety systems for vehicles, particularly safety systems for passenger vehicles such as automobiles. One safety system which is being thoroughly investigated is one utilizing an inflatable bag or confinement which is automatically inflated in response to a predetermined condition of the automobile to prevent the occupant of the automobile from contacting the instrument panel, windshield, or the like. In other words, the bag is inflated during a crash to prevent the occupant of the automobile from incurring serious injuries as a result of impact with the interior of the vehicle body.

It will be appreciated that the time in which the bag must be inflated is very critical and is measured in terms of milliseconds. Consequently, one of the problems being thoroughly researched is that relating to a means for rapidly inflating the bag. One such means which has proven satisfactory is an elongated cyclindrical container or reservoir for storing the pressurized fluid and including an explosive charge disposed within the container so that upon activation of the explosive charge, the container is opened to exhaust pressurized fluid into the bag for inflating the bag. If the explosive charge is merely disposed within the container and detonated, all of the energy will be expended to provide a relatively large opening in the container in the area thereof adjacent the position of the explosive means. It has been found, however, that if a limiting means is disposed about the inner container so as to limit the outward radial movement of the container portions on either side of the opening resulting from the detonation of the explosive means, the opening of the container will extend longitudinally therealong substantially from one end to the other. A typical means which has been utilized in the prior art to limit or control the opening of the inner container is a cylindrical member disposed about the inner container and having a plurality of holes therealong circumferentially aligned with the area of the inner container which is to be opened as a result of the activation of the explosive means. Such a cylindrical member, however, is relatively difficult and expensive to manufacture and may adversely affect the flow of fluid from the pressurized container upon the opening thereof.

Accordingly, it is an object and feature of this invention to provide an improved member disposed about a container for storing fluid so that the improved member controls the opening of the container means when an explosive means is disposed therein and activated.

Another object and feature of this invention is to provide a safety assembly including an inflatable bag with a container means in communication with the bag to store fluid for inflating the bag and including an explosive means disposed in the container means for opening the container means upon activation thereof and a helically coiled means having spaced convolutions disposed about the container means for controlling the opening of the container means when the explosive means is activated.

In general, these and other objects and features of this invention may be attained in a safety assembly adapted to be attached to a vehicle for protecting the occupant thereof and which includes an inflatable bag and a container means in communication with the bag to store fluid for inflating the bag. An explosive means is supported within the container means for opening the container means upon the activation thereof. A spring-like member defined by an element having a circular or rectangular cross section is helically coiled in spaced convolutions about the container means for controlling the opening of the container means by limiting the radially outward movement of the portions of the container means on each side of the opening thereof. An outer member having a plurality of spaced elongated narrow slots therein is disposed about the spring-like member for controlling the flow of fluid from the container means to the bag so as to prevent the inadvertent rupture of the bag as it is being inflated.

Other objects and attendant advantages of the present invention will be readily appreciated as the same becomes better understood by reference to the following detailed description when considered in connection with the accompanying drawings wherein.

Figure 1:
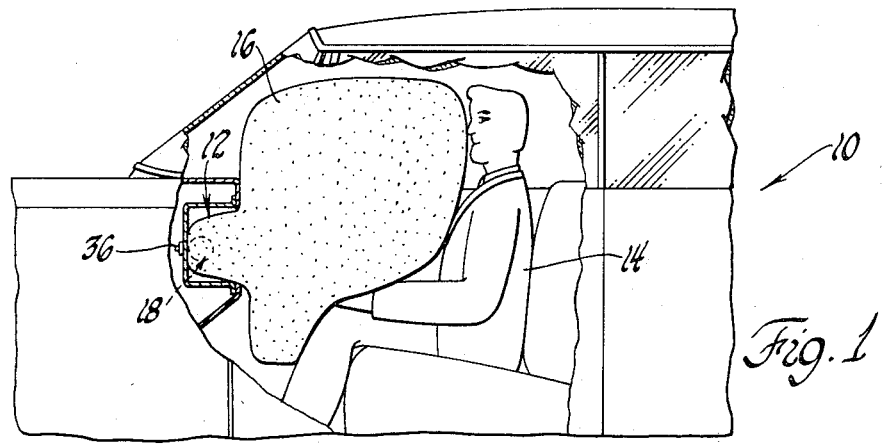
FIGURE 1 is a partially broken away fragmentary view of a preferred embodiment of the assembly of the instant invention.
Figure 2:
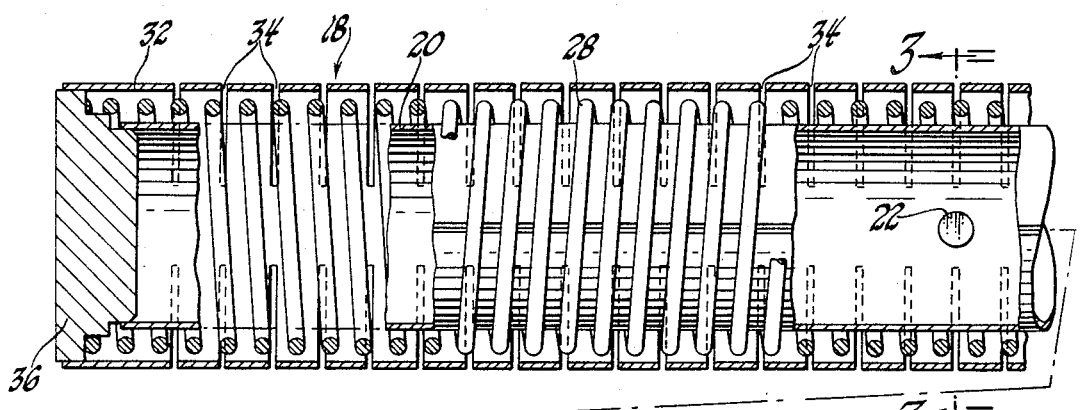
FIGURE 2 is an enlarged cross-sectional view of the fluid source utilized in the assembly of the instant invention.

Referring now to the drawings, wherein like numerals indicate like or corresponding parts throughout the several views, a vehicle is generally shown at 10 in combination with a safety assembly, generally shown at 12, for protecting the occupant 14 of the vehicle.

The assembly includes an inflatable bag or confinement 16 and a fluid source, generally shown at 18. The fluid source 18 contains pressurized fluid for inflating the bag 16. The bag 16 is normally stowed in a collapsed folded position and an appropriate sensing means (not shown) is utilized to inflate the bag 16 in the event of a crash or any other predetermined operating condition of the vehicle so as to prevent the occupant 14 from moving forward and impacting against portions of the vehicle, such as the instrument panel and/or windshield.

The fluid source 18 includes a fluid reservoir or container means comprising the elongated cylinder 20 which is in communication with the bag 16 for inflating the bag. The cylinder 20 stores pressurized fluid and is charged through an appropriate check valve (not shown). Associated with the cylinder 20 is a support means comprising the receptacle 22 to support an explosive means 24 which opens the cylinder 20 upon the activation thereof. The cylinder 20 has a groove 26 extending longitudinally therealong. The groove 26 forms a weakened portion referred to as a stress riser.

A helically coiled means, which comprises a spring-like member defined by an element 28 having a circular cross section, is helically coiled in spaced convolutions about the cylinder 20. The spring-like member is disposed about the cylinder 20 for controlling the opening of the cylinder 20 when the explosive means 24 is actuated. An electrical lead 30 extends away from the explosive means 24 and is attached to an appropriate sensing means, such as an accelerometer or an inertia responsive switch. An example of such a sensing means is disclosed in copending application Ser. No. 562,289 filed July 7, 1966, in the names of Sidney Oldberg and William R. Carey and assigned to the assignee of the instant invention. As a result of a predetermined operating condition of the vehicle, the sensing means sends a signal through the lead 30 to detonate the explosive means 24 which in turn ruptures the receptacle 22 to apply a force to the cylinder 20 so that it ruptures or breaks along the groove 26. As the cylinder 20 opens along the groove 26, portions of the cylinder 20 on either side of the groove 26 move radially outward until they contact the spaced convolutions of the spring-like member defined by the element 28. The cylinder 20 initially opens along the groove 26 opposite the position of the explosive means 24, but due to the restraint provided by the element 28, the cylinder 20 opens along the groove 26 along a predetermined length or substantially from one end to the other thereof. In other words, if the restraint by the element 28 was not provided all of the energy resulting from the activation of the explosive means might be expended to produce one large hole in the cylinder 20 opposite the receptacle 22.

There is also included flow control means comprising the cylindrical member 32 disposed about the spring-like member to control the flow of fluid from cylinder 20 when opened by the explosive means 24 for preventing the inadvertent rupture of the bag 16. The outer cylindrical member 32 has a plurality of spaced elongated narrow slots 34 therein which are circumferentially spaced from the area of the opening of the cylinder 20 as defined by the groove 26. There is also included plug means 36 to define the ends of the cylinder 20 and the outer member 32.

It will be appreciated that the helical spring-like member defined by the element 28 controls the opening of the cylinder 20 and has a minimal adverse affect upon the flow of fluid from the cylinder 20. The flow of fluid from the cylinder 20 flows out through the elongated narrow slots 34 and into the bag 16. The disposition and configuration of the slots 34 have been found to prevent the inadvertent rupturing of the bag as it is being inflated. The outer cylindrical member 32 and the slots 34 are disclosed and claimed in copending application Ser. No. 621,845 filed Mar. 9, 1967, and assigned to the assignee of the instant invention. The disposition and significance of the receptacle 22 is disclosed and claimed in copending application Ser. No. 622,348 filed Mar. 10, 1967, in the name of Charles O. Berryman and assigned to the assignee of the instant invention.

Figure 4:
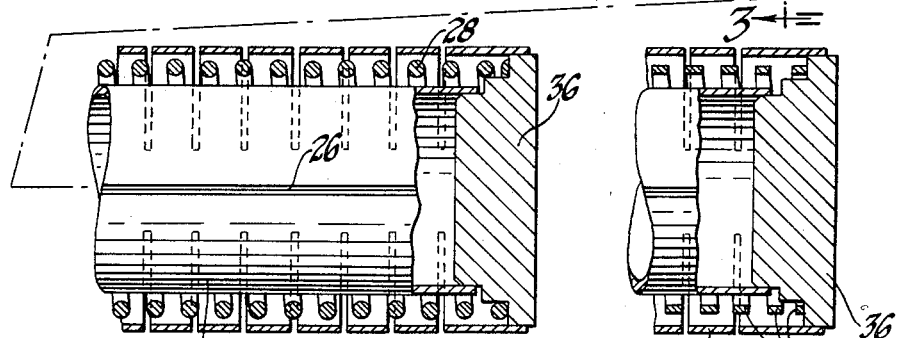
FIGURE 4 is a cross-sectional view of an alternative embodiment.
Figure 3:
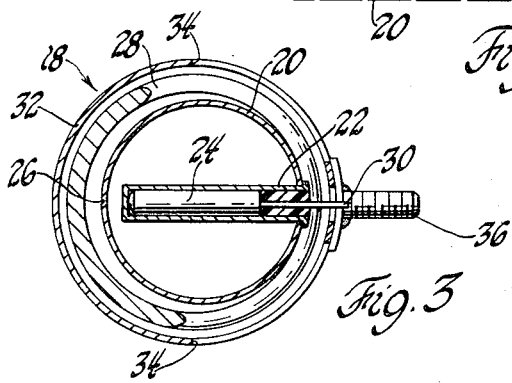
FIGURE 3 is a cross-sectional view taken substantially along line 3—3 of FIGURE 2.

As indicated at 40 in FIGURE 4, the element 28 may in an alternative embodiment have a rectangular cross section. The rectangular cross section has an advantage over the circular cross section in certain embodiments. More specifically, in some embodiments, the detonation of the explosive charge 24 moves the portions on either side of the opening along the groove 26 of the inner container 20 radially outwardly and in so doing the convolutions of the element 28 are moved longitudinally relative to the inner container 20 so that the opening of the inner container 20 is not appropriately controlled. By using the helical element having the rectangular cross section as disclosed at 40, the corners or edges of each convolution tend to dig into or grip the inner container 20 when it is opened thereby preventing movement of the respective convolutions longitudinally of the inner container 20 thereby to more precisely control the opening thereof.

The bolts or studs 36 are secured by welding, or the like, to the outer cylindrical member 32 for attaching the assembly to the vehicle, as illustrated in FIGURE 1.

The groove 26 forms a stress riser and predetermines the area of opening of the cylinder 20; however, other appropriate means may be utilized for predetermining the area of the opening without utilizing the stress riser. One such means for predetermining the area of opening of the container 20 is described and claimed in copending application Ser. No. 622,349 filed Mar. 10, 1967, and assigned to the assignee of the instant invention.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A safety assembly adapted to be attached to a vehicle for protecting an occupant thereof, said assembly comprising; an inflatable bag, container means in communication with said bag to store fluid for inflating said bag, support means in association with said container means to support explosive means for opening said container means upon activation of the explosive means, and helically coiled means having spaced convolutions disposed about said container means for controlling said opening of said container means when the explosive means is activated.

2. An assembly as set forth in claim 1 wherein said container means comprises an elongated cylinder and said helically coiled means comprises a spring-like member defined by an element having a circular cross section and helically coiled in said spaced convolutions.

3. An assembly as set forth in claim 1 wherein said helically coiled means comprises a spring-like member defined by an element having a cross section with at least one corner.

4. An assembly as set forth in claim 3 wherein said container means comprises an elongated cylinder and said helically coiled-means comprises a spring-like member defined by an element having a rectangular cross section and helically coiled in said spaced convolutions.

5. An assembly adapted to be attached to an inflatable bag for inflating same to provide a safety assembly which may be utilized in a vehicle to protect an occupant thereof, said assembly comprising; container means to store fluid for inflating a bag, support means in association with said container means to support explosive means for opening said container means upon activation of the explosive means, and helically coiled means having spaced convolutions disposed about said container means for controlling said opening of said container means when the explosive means is activated.

6. An assembly as set forth in claim 5 wherein said container means comprises an elongated cylinder and said helically coiled means comprises a spring-like member defined by an element having a circular cross-section and helically coiled in said spaced convolutions.

7. An assembly as set forth in claim 5 wherein said container means comprises an elongated cylinder and said helically coiled means comprises a spring-like member defined by an element having a cross section defining at least one corner and helically coiled in said spaced convolutions.

8. In a vehicle safety apparatus including a confinement having a collapsed inoperative condition and an expanded operative condition, the confinement when in said expanded operative condition being effective to restrain movement of an occupant of a vehicle during a collison, a fluid reservoir for containing a supply of fluid for expanding the confinement, and means actuatable to effect the formation of an opening in the reservoir, the improvement comprising, in combination with the fluid reservoir, of helically coiled means having spaced convolutions disposed about the fluid reservoir for controlling the opening formed in the reservoir when said means operable to effect the formation of said opening is actuated.

9. In a vehicle safety apparatus as defined in claim 8 wherein said helically coiled means comprises a spring-like member having convolutions of a circular cross section.

10. In a vehicle safety apparatus as defined in claim 8 wherein said helically coiled means comprises a spring-like member having convolutions of a rectangular cross section.

11. In a vehicle safety apparatus as defined in claim 8 wherein said means for effecting the formation of said opening comprises explosive means.

References Cited
UNITED STATES PATENTS

| | | | |
|---|---|---|---|
| 2,850,291 | 9/1958 | Ziccardi | 280—150 |
| 3,197,234 | 7/1965 | Bertrand | 280—150 |

BENJAMIN HERSH, *Primary Examiner.*

J. SIEGEL, *Assistant Examiner.*